US012809742B1

(12) United States Patent
Geyer

(10) Patent No.: US 12,809,742 B1
(45) Date of Patent: Nov. 24, 2026

(54) METHOD FOR SUMMARIZING A SECURE REMOTE ACCESS SESSION FOR LOGGING AND AUDIT

(71) Applicant: Claroty Ltd., Tel Aviv-Jaffa (IL)

(72) Inventor: Grant Geyer, Bethesda, MD (US)

(73) Assignee: Claroty Ltd., Tel Aviv-Jaffa (IL)

( * ) Notice: Subject to any disclaimer, the term of this patent is extended or adjusted under 35 U.S.C. 154(b) by 0 days.

(21) Appl. No.: 19/433,350

(22) Filed: Dec. 26, 2025

(51) Int. Cl.
*G06F 11/34* (2006.01)
*G06F 16/34* (2019.01)

(52) U.S. Cl.
CPC ........ *G06F 11/3476* (2013.01); *G06F 16/345* (2019.01)

(58) Field of Classification Search
CPC ........................... G06F 11/3476; G06F 16/345
USPC ........................................................... 714/45
See application file for complete search history.

(56) References Cited

U.S. PATENT DOCUMENTS 7,840,285 B2 * 11/2010 Wilson ................ G05B 19/042 709/224
9,185,175 B1 * 11/2015 Sharma ................. H04L 67/306
2025/0373648 A1 * 12/2025 Bassi .................. H04L 63/1441

FOREIGN PATENT DOCUMENTS

DE 112018000884 T5 * 10/2019 ............. H04H 60/85
WO WO-2018109119 A1 * 6/2018 ........... H04L 67/141

OTHER PUBLICATIONS

English Translation of DE112018000884-T5 (Year: 2019).*

* cited by examiner

*Primary Examiner* — Chae M Ko
(74) *Attorney, Agent, or Firm* — M&B IP Analysts, LLC

(57) ABSTRACT

A system and method for securely logging actions during a session between an operational technology (OT) asset and a user remote from the OT asset is presented. The method includes authenticating the user with user credentials to access the OT asset; creating a session between the user and the OT asset, the session configured to allow the user to control the OT asset through a graphical user interface (GUI) of the OT asset; capturing user input metadata during the session from the OT asset; capturing a video stream from a webcam configured to view the GUI; timestamping the captured user input metadata and the video stream; analyzing, in real time, frames of the video stream before, during, and after pieces of user input metadata; identifying, in real time, actions performed during the session from the analyzed frames; and generating, in real time, text-based logs from the identified visual events.

21 Claims, 5 Drawing Sheets

METHOD FOR SUMMARIZING A SECURE REMOTE ACCESS SESSION FOR LOGGING AND AUDIT

TECHNICAL FIELD

The present disclosure relates generally to cybersecurity in an Operational Technology (OT) environment and network logging and auditing.

BACKGROUND

The convergence of Information Technology (IT) and Operational Technology (OT) has rendered previously protected and isolated critical infrastructure, such as manufacturing plants, power plants and grids, and water treatment facilities, vulnerable unauthorized access and tampering. Nevertheless, the connectivity of critical infrastructure in an OT network is needed to enable remote monitoring, scheduled maintenance, and critical support from third-party vendors, original equipment manufacturers (OEMs), and contractors.

However, this connectivity creates a profound security risk, particularly with remote access to critical infrastructure. Traditional IT remote access tools, such as virtual private networks (VPNs) and jump servers, are not effective to protect OT networks. These tools grant broad, "flat" network access in which any asset, or cyber physical system (CPS), can communicate with any other asset within an OT network. Additionally, these tools are difficult to manage, lack granular control of access, and do not provide auditing required for sensitive industrial environments.

State-of-the-art OT cybersecurity systems provide granular, "least privilege" access to individual users to specific assets for specific times. They use multifactor authentication (MFA) to provide an identified user a remote session with a target OT asset. In some cases, authentication may be required to be assigned a particular role to access the target OT asset. The identity of the identified user is bound to the remote session because the target OT asset may be arranged to be accessed by a shared local account available to multiple users. For example, the target OT asset shared local account may be role based. Auditing is facilitated by full, high-definition video recordings of every remote session (e.g., Remote Desktop Protocol (RDP), Virtual Network Computing (VNC)) as well as capture of metadata such as keystrokes of authenticated users.

The auditing in state-of-the-art OT cybersecurity systems is inefficient and hinders appropriate incident response. For example, an entire, and possibly long duration, video recording must be manually watched to see that the activities in the remote session complied with OT network policies, such as the Management of Change (MoC) plan. Such viewing is rarely performed comprehensively. Another example of a shortcoming in state-of-the-art OT cybersecurity systems is keystroke capture. In this case, keystroke capture records certain interactions with an OT asset based on a keyboard, such as secure shell (SSH) implementation. However, keystroke capture does not record an authenticated user's interaction with a graphical user interface (GUI) for manipulating controls in a graphic dashboard in the GUI on a human machine interface (HMI). For example, keystroke capture is unable to record a mouse click at a particular horizontal, vertical (X,Y) coordinate to perform tasks, such as adjust a setpoint in a graphical meter, or toggle a virtual switch in a desktop. This problem is a result of poor synchronization between the logged keystrokes/mouse clicks and the video recording of the GUI of the target asset.

Another problem with auditing in state-of-the-art OT cybersecurity systems is tampering, particularly when authentication is performed based on role, rather than individual identity. For example, an attacker, such as a malicious insider, who gains access, may delete or corrupt event logs locally stored on a target asset, such as an HMI or engineering workstation (EWS). If authentication only requires access based on a user's role, not on a user's individual identity, the video, stored out-of-bound from the target asset, is the only evidence linking a user's identity to a tampering action on the locally stored logs.

It is advantageous to implement automatic interpretation of video recordings as well as capture and manipulation of features in graphical user interfaces. An additional desirable feature is summarization of the captured records in plain English for rapid audit and compliance verification.

It would therefore be advantageous to provide the foregoing solutions that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation, causes or cause the system to perform the actions. One or more computer programs can be configured to perform particular operations or actions by virtue of including instructions that, when executed by data processing apparatus, cause the apparatus to perform the actions.

In one general aspect, the method may include authenticating the user with user credentials to access the OT asset; creating a session between the user and the OT asset, the session configured to allow the user to control the OT asset through a graphical user interface (GUI) of the OT asset; capturing user input metadata during the session from the OT asset; capturing a video stream from a webcam configured to view the GUI; timestamping the captured user input metadata and the video stream; analyzing, in real time, frames of the video stream before, during, and after one or more pieces of user input metadata; identifying, in real time, one or more actions performed during the session from the analyzed frames; generating, in real time, text-based logs from the one or more identified visual events. Other embodiments of this aspect include corresponding computer systems, apparatus, and computer programs recorded on one or more computer storage devices, each configured to perform the actions of the methods.

Implementations may include one or more of the following features. The method may include: authorizing the user a limited access to the OT asset for a predefined limited time during the session in accordance with a management of change (MoC) ticket; binding to the session an identifier to allow access to the OT asset, where the identifier is any one of: an identifier of the session, an identifier of the user, an identifier of the OT asset, an identifier of a role of an user, and an identifier of the webcam.

The method where analyzing the frames of the video stream further may include: detecting one or more visual features in the GUI using computer vision (CV); comparing the one or more detected, visual features with one or more standard features in an OT interface profile database; and identifying one or more control features in the GUI from one or more matches between the one or more detected visual features and the one or more standard features, where the one or more of the identified control features, configured to control any of the OT asset or one or more other OT assets, controlled by the OT asset, based on the compared, detected one or more visual features.

The method where analyzing the frames of the video stream further may include: interpreting one or more text labels among the one or more detected visual features with optical character recognition (OCR).

The method where identifying visual events from the analyzed frames further may include: identifying one or more visual events from one or more modifications in the detected visual features before, during, and after one of the one or more pieces of user input metadata.

The method where a visual event of the one or more identified visual event is a placement of a cursor in the GUI, by a mouse operated by the user, at one of the one or more identified control features in the GUI to adjust the one of the one or more identified control features.

The method where an action performed during the one or more identified visual event is an adjustment of one of the one or more identified control features in the GUI.

The method where an action performed during the one or more identified visual event is a change in a setpoint, indicated in the GUI, of the OT asset or one of one or more other OT assets, controlled by the OT asset; generating a human-readable summary of one or more actions performed during the one or more identified visual events. Implementations of the described techniques may include hardware, a method or process, or a computer tangible medium.

In one general aspect, the non-transitory computer-readable medium may include one or more instructions that, when executed by one or more processing circuitries of a device, cause the device to: authenticate the user with user credentials to access the OT asset; create a session between the user and the OT asset, the session configured to allow the user to control the OT asset through a graphical user interface (GUI) of the OT asset; capture user input metadata during the session from the OT asset. Medium may furthermore include capture a video stream from a webcam configured to view the GUI; timestamp the captured user input metadata and the video stream; analyze, in real time, frames of the video stream before, during, and after one or more pieces of user input metadata; identify, in real time, one or more actions performed during the session from the analyzed frames; generate, in real time, text-based logs from the one or more identified visual events. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: authenticate the user with user credentials to access the OT asset; create a session between the user and the OT asset, the session configured to allow the user to control the OT asset through a graphical user interface (GUI) of the OT asset; capture user input metadata during the session from the OT asset; capture a video stream from a webcam configured to view the GUI; timestamp the captured user input metadata and the video stream; analyze, in real time, frames of the video stream before, during, and after one or more pieces of user input metadata; identify, in real time, one or more actions performed during the session from the analyzed frames; generate, in real time, text-based logs from the one or more identified visual events. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: authorize the user a limited access to the OT asset for a predefined limited time during the session in accordance with a management of change (MoC) ticket.

The system where the memory contains further instructions which when executed by the processing circuitry further configure the system to: bind to the session an identifier to allow access to the OT asset, where the identifier is any one of: an identifier of the session, an identifier of the user, an identifier of the OT asset, an identifier of a role of an user, and an identifier of the webcam.

The system where the memory contains further instructions that, when executed by the processing circuitry for analyzing the frames of the video stream, further configure the system to: detect one or more visual features in the GUI using computer vision (CV); compare the one or more detected, visual features with one or more standard features in an OT interface profile database; and identify one or more control features in the GUI from one or more matches between the one or more detected visual features and the one or more standard features, where the one or more of the identified control features, configured to control any of the OT asset or one or more other OT assets, controlled by the OT asset, based on the compared, detected one or more visual features.

The system where the memory contains further instructions that, when executed by the processing circuitry for analyzing the frames of the video stream, further configure the system to: interpret one or more text labels among the one or more detected visual features with optical character recognition (OCR).

The system where the memory contains further instructions that, when executed by the processing circuitry for identifying visual events from the analyzed frames, further configure the system to: identify one or more visual events from one or more modifications in the detected visual features before, during, and after one of the one or more pieces of user input metadata.

The system where a visual event of the one or more identified visual event is a placement of a cursor in the GUI, by a mouse operated by the user, at one of the one or more identified control features in the GUI to adjust the one of the one or more identified control features.

The system where an action performed during the one or more identified visual event is an adjustment of one of the one or more identified control features in the GUI.

The system where an action performed during the one or more identified visual event is a change in a setpoint, indicated in the GUI, of the OT asset or one of one or more other OT assets, controlled by the OT asset.

The system where the memory contains further instructions which when executed by the processing circuitry further configure the system to: generate a human-readable summary of one or more actions performed during the one or more identified visual events. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
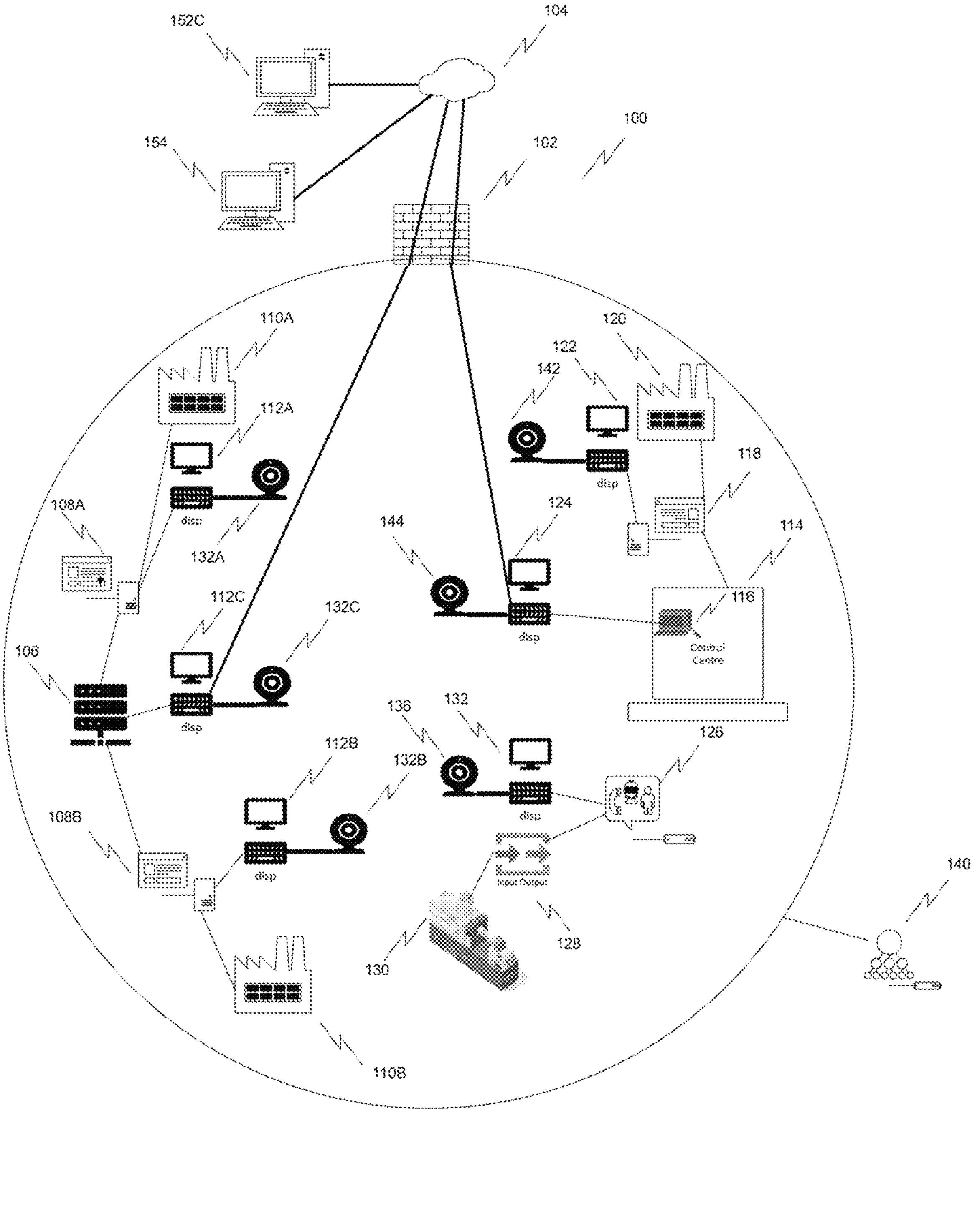
FIG. 1 is an example illustration of a monitored and logged operational technology (OT) network, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The following description relates to systems and methods for behavior-based threat detection in operational technology (OT) networks. As used herein, an "OT network" may refer to a network of hardware and software systems that monitor and control industrial equipment, assets, processes, and events. Examples of such systems may include industrial control systems (ICS), such as supervisory control and data acquisition (SCADA) systems, distributed control systems (DCS), and programmable logic controllers (PLCs), and other assets commonly found in manufacturing, utilities, such as electric power generation and distribution (e.g., electrical grid), transportation, and critical infrastructure environments, such as oil and gas, water treatment, and electricity distribution.

SCADA systems and DCSes interface with remote terminal units (RTUs) to monitor and control industrial plants. In an embodiment, a DCS is configured, managed, and maintained through an engineering workstation operated by one or more users. In an embodiment, a human machine interface (HMI) is operated by one or more users to diagnose and configure one or more industrial plants monitored and controlled by a SCADA system. In another embodiment, an HMI is operated by one or more users to diagnose and configure an industrial plant monitored and controlled by a DCS. In still another embodiment, an HMI is operated by one or more users to diagnose and configure industrial equipment monitored and controlled by a PLC. In the foregoing embodiments, the HMI is in direct communication with the SCADA system, the DCS, and the PLC, respectively. In a certain embodiment, an HMI is operated by one or more users to diagnose industrial equipment in direct communication with the HMI.

Accordingly, the disclosed method is rooted in computer technology and is directed to a technical solution to a technical problem, namely, secure and scalable zone-based segmentation and communication control in OT networks. The method applies technological tools (e.g., network monitoring, segmentation controllers, communication gateways) to implement a practical application that improves the functioning of computer and industrial networks. As will be discussed above, the implementation and execution of the disclosed method can be carried out by a hardware system.

FIG. 1 shows a monitored operational technology (OT) network 100 according to an embodiment. OT network 100 is configured to include firewall 102 to restrict traffic between OT network 100 and the Internet 104. OT network 100 is configured to include SCADA system 106, remote terminal units (RTU) 108A, 108B, and industrial plants 110A, 110B. SCADA system 106 is configured to interface with RTUs 108A, 108B to monitor and control processes in industrial plants 110A, 110B, respectively. Industrial plants 110A, 110B may provide a service over a large geographic area, such as any of wastewater treatment, water, electricity production and distribution, and oil and gas extraction and delivery, over the large geographic area.

In an embodiment, one or more remote users monitor and control industrial plant 110A through HMI 112A, directly connected to RTU 108A. In an alternative embodiment, one or more remote users monitor and control industrial plant 110B through HMI 112B, directly connected to RTU 108B. In a separate embodiment, one or more remote users monitor and control any of industrial plant 110A and industrial plant 110B through HMI 112C, directly connected to SCADA system 106.

In an embodiment, HMIs 112A, 112B, and 112C are configured to be monitored by webcams 132A, 132B, and 132C, respectively. With access by remote users, each of webcams 132A, 132B, and 132C, is configured to capture video of a screen of HMI 112A, 112B, and 112C, respectively. Video recordings of webcams 132A, 132B, and 132C are configured to be stored outside OT network 100.

In an embodiment, one or more remote users may use personal computer 152C to access HMI 112C through Internet 104 and firewall 102. The access may be facilitated through applications, such as secure shell (SSH), Remote Desk Protocol (RDP), Virtual Network Computing (VNC), and the like. These applications allow the one or more remote users to access the screen of HMI 112C on the screen of a personal computer 152C as if the one or more remote users were physically accessing HMI 112C directly.

OT network 100 is also configured to include DCS 114, controlled by engineering workstation (EWS) 116, internal to DCS 114. DCS 114 is configured to interface with RTU 118 to manage operations and monitor the workflow of industrial plant 120. Industrial plant 120 may be used for manufacturing of a variety of items, such as durable goods, foods and beverages, chemicals, including pharmaceuticals, and the like.

In an embodiment, one or more remote users manage and control industrial plant 120 through HMI 122, directly connected to RTU 118. In an alternative embodiment, one or more remote users may use personal computer 154 to manage industrial plant 120 through HMI 124, directly connected to EWS 116, through Internet 104 and firewall 102. As discussed above, the access to HMI 124 may be facilitated through applications, such as secure shell (SSH), Remote Desk Protocol (RDP), Virtual Network Computing (VNC), and the like.

OT network 100 is additionally configured to include PLC 126, input/output module 128, industrial equipment 130, and human machine interface (HMI) 124. PLC 126 is configured to interface with input/output module 128 to control industrial equipment 130. HMI 132, directly connected to PLC 126, allows one or more users to monitor and control industrial equipment 130.

In an embodiment, industrial plants 110A, 110B, 120 may have several pieces of industrial equipment, like industrial equipment 130, with one or more of the several pieces controlled and monitored by one or more PLCs like PLC 126 and one or more HMIs like HMI 132, directly connected to a PLC to monitor and control industrial equipment directly connected to the PLC. In an embodiment, such industrial equipment may be used in different stages of producing any of a component of a final product or a final product itself.

In an embodiment, one or more remote users manage and control industrial plant 120 through HMI 122, directly connected to RTU 118. In an alternative embodiment, one or more users manage industrial plant 120 through HMI 124, directly connected to EWS 116.

As shown in an embodiment in FIG. 1, industrial equipment 130 is in a free-standing environment remote from other pieces of industrial equipment. An example of this embodiment may be rapid prototyping equipment at a research and development facility used to prepare prototypes of prospective products to be manufactured in an industrial plant, like industrial plant 120.

HMIs 122, 124, and 132 are monitored by webcams 142, 144, and 136, respectively. Video recordings of webcams 142, 144, and 136 are stored outside OT network 100. Video recordings of webcams 132A, 132B, 132C, 142, 144, and 136 are configured to be viewed outside OT network 100 by one or more human auditors of logs.

OT network 100 is configured to include management controller 140. Management controller 140 is configured to implement firmware downloads, firmware updates, configuration uploads, control logic changes, and other maintenance actions in accordance with a management-of-change (MoC) system. As shown in FIG. 1, management controller 140 is situated at OT network 100, but may be remote over the Internet 104.

HMIs 112A, 112B, 112C, 122, 124, and 132 log input metadata of remote users locally on the respective HMI. This arrangement may give rise to tampering by one or more remote users accessing an HMI storing logged input metadata.

Figure 2:
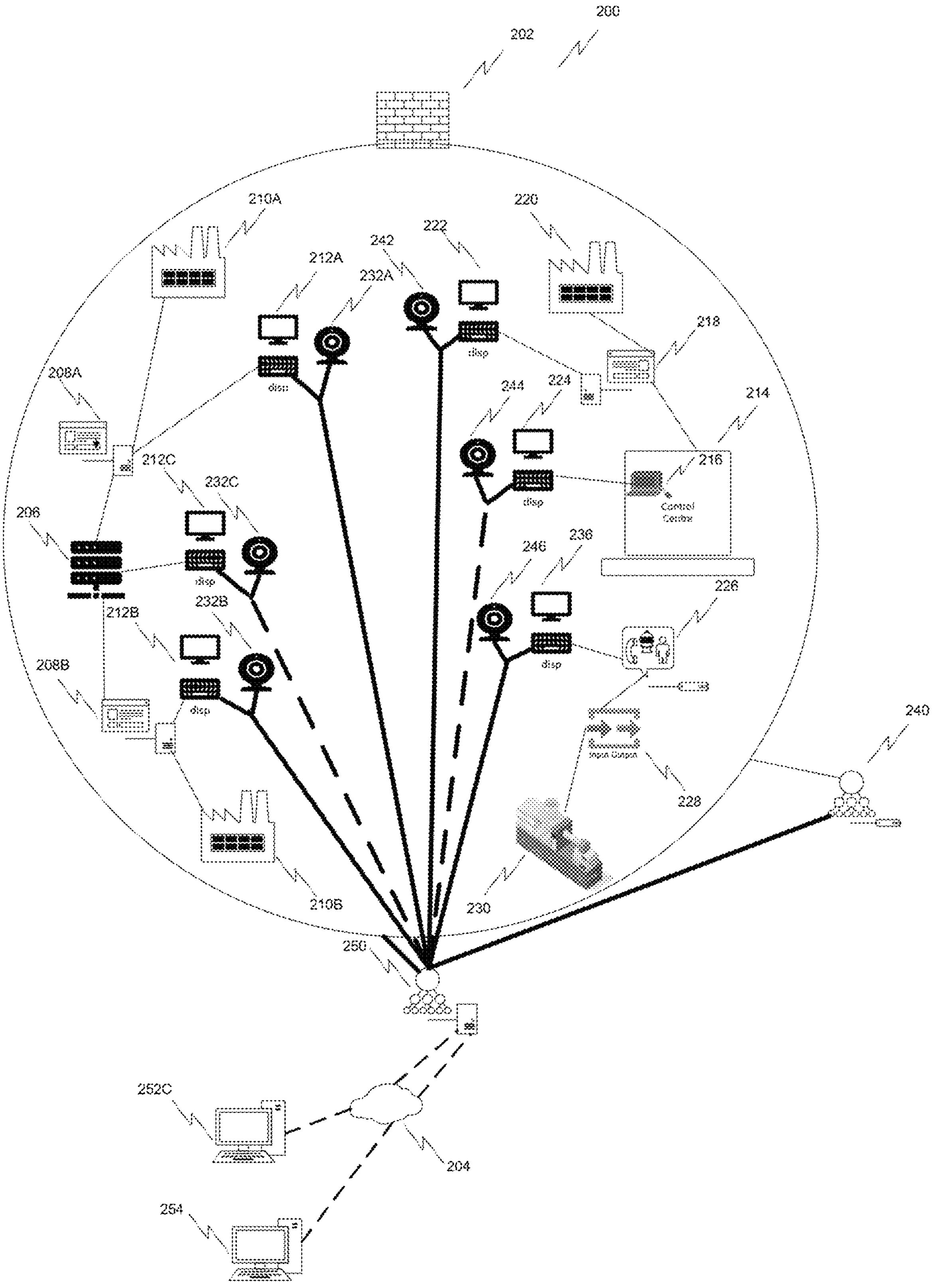
FIG. 2 is an example illustration of a remotely monitored and logged OT network, implemented in accordance with an embodiment.

FIG. 2 is an example illustration of remotely monitored and logged OT network 200, implemented in accordance with an embodiment. Monitored OT network 200 is configured to include firewall 202 to restrict traffic between monitored OT network 200 and the Internet 204. Monitored OT network 200 is configured to include SCADA system 206, RTUs 208A, 208B and plants 210A, 210B. SCADA system 206 is configured to interface with RTUs 208A, 208B to monitor and control processes in plants 210A, 210B, respectively.

Remotely monitored and logged OT network 200 is also configured to include DCS 214, RTU 218, and plant 220. DCS 214 is configured to interface with RTU 218 to manage operations and monitor workflow of plant 220. In an embodiment, DCS 212 is configured to include EWS 216 as a controller of operation of DCS 212.

Remotely monitored and logged OT network 200 is additionally configured to include PLC 226, input/output module 228, and industrial equipment 230. PLC 226 is configured to interface with input/output module 228 to control industrial equipment 230.

Remotely monitored and logged OT network 200 is configured to include management controller 240. Management controller 240 is configured to implement firmware downloads, firmware updates, configuration uploads, control logic changes, and other maintenance actions in accordance with a management-of-change (MoC) system. In an embodiment, management controller 240 may be an engineering workstation. In a separate embodiment, management controller 240 may be a central control system server. In an embodiment, management controller 240 may be within or adjacent to the monitored OT network 200. In another embodiment, management controller 240 may be remote from OT network 200.

Remotely monitored and logged OT network 200 is configured to include webcams 232A, 232B, 232C, 242, 244, and 246. In an embodiment, each of webcams 232A, 232B, 232C, 242, 244, and 246 is configured to capture video of a screen of HMIs 212A, 212B, 212C, 222, 224, and 236, respectively.

Remotely monitored and logged OT network 200 is configured to include secure remote access (SRA) broker 250. SRA broker 250 is configured to be connected to HMIs 212A, 212B, 212C, 222, 224, and 236, and webcams 232A, 232B, 232C, 242, 244, and 246 to collect data for logs. Additionally, SRA broker 250 is configured to be connected to management controller 240 to access MoC system information.

For example, in an embodiment, one or more remote users may use personal computer 252C to remotely access HMI 212C to monitor and control operations of industrial plants 210A, 210B, overseen by SCADA system 206, through RTU 208A, 208B. In another embodiment, one or more remote users may use personal computer 254 to remotely access HMI 224 to monitor and control, through EWS 216, operations of industrial plant 220, overseen by DCS 214, through RTU 218. In both embodiments, as discussed in more detail below, secure remote access broker 250 is configured to authenticate the one or more remote users of personal computers 252C, 254 and establish sessions on HMI 212C, 224, respectively. Subsequently, SRA broker 250 captures input user metadata on HMI 212C, 224 and video data from webcams 232C, 244 for log generation of remote sessions accessed through personal computers 252C, 254, respectively.

Figure 3:
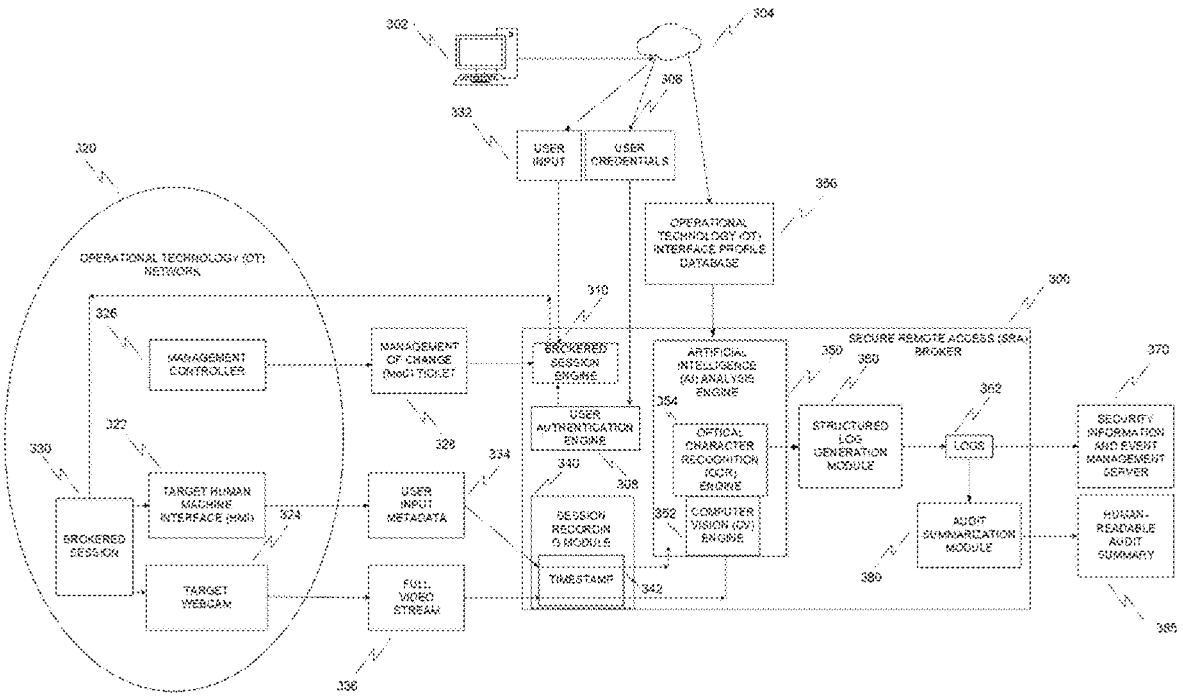
FIG. 3 is a schematic diagram of a secure remote access (SRA) broker performing for one or more remote users authentication, brokered session creation, and session log generation, implemented in accordance with an embodiment.

FIG. 3 is a schematic diagram of a secure remote access (SRA) broker 300 performing for one or more remote users authentication, brokered session creation, and session log generation in an operational technology (OT) network 320, implemented in accordance with an embodiment.

In an embodiment, one or more remote users initiate a session on an asset in OT network 320 through personal computer 302. In an embodiment, personal computer 302 is connected to the Internet 304. In an embodiment, the one or more remote users provide user credentials 306 to SRA broker 300 to establish a session on an asset in OT network 320. In an embodiment, user credentials 306 are processed in user authentication engine 308. In an embodiment, user credentials 306 include an identifier of one of the one or more remote users, such as an email address of an entity the one of the one or more remote users is affiliated with. In an embodiment, such an entity may be an owner/operator of an industrial plant within OT network 320. In an embodiment, an entity may be a vendor or contractor authorized to access assets within OT network 320. In an embodiment, user credentials 306 may include other information to facilitate multi-factor authentication (MFA) for the one of the one or more remote users. In an embodiment, such information may include a username, a password, a personal identification number (PIN), an identifier of a target asset the one of the one or more remote users is trying to access, alternate contact information to the one of the one or more remote users, and the like.

In an embodiment, authentication of the one of the one or more remote users fails. In an embodiment, the failed authentication may be logged as an event including any of a record of an identifier of the one of the one or more remote users, such as an email address, an identifier of a target asset the one of the one or more remote users attempted to access, desired resources on the target asset, a timestamp indicating the time and date of the failed authentication, and the like. For example, an email address may be john.doe@contractor.com. Such an email address indicates an employee of a contractor for an owner/operator of one or more assets in the OT network 320.

In an embodiment, authentication is successful and user authentication engine 308 sends approval to brokered session engine 310. Brokered session engine 310 is configured to establish brokered session 330 for the one of the one or more remote users to access target HMI 322. Target webcam 324 is configured to capture video of a graphical user interface (GUI) of a screen on target HMI 322 during brokered session 330. In an embodiment, management controller 326 is configured to maintain or have access to MoC system information. In an embodiment, brokered session engine 310 obtains, from management controller 326, MoC ticket 328. MoC ticket 328 is configured to limit the permissible activity and duration of access of the one of the one or more remote users to target HMI 322.

In an embodiment, brokered session engine 310 is configured to establish brokered session 330 for the one of the one or more remote users to access target HMI 322 using a vaulted, shared local credential to log into target HMI 322. In an embodiment, brokered session engine 310 is configured to create brokered session 330 immutable including a session identifier, an identifier for the one of the one or more remote users, an identifier for the target HMI and the vaulted, shared local credential. For example, brokered session 330 may include Session_ID: 778 mapping the one of the one or more remote users: john.doe@contractor.com to target HMI 322/target webcam 324 using vaulted, shared local credential: Operator. In an embodiment, the one of the one or more remote users enters user input 332 through brokered session engine 310 into brokered session 330.

In an embodiment, user input metadata 334 and full video stream 336 are configured to be recorded by session recording module 340. In an embodiment, user input metadata 334 includes keystrokes, mouse/cursor movement, mouse clicks at coordinates in the GUI where the cursor is located, and the like. In an embodiment, timestamp 342 timestamps user input metadata 334 and frames of full video stream 336 upon reception.

In an embodiment, user input metadata 334 may be a time-correlated list of user inputs corresponding to frames of full video stream 336 timestamped immediately before, during, and after a user input.

In an embodiment, artificial intelligence (AI) analysis engine 350 is configured to receive user input metadata 334 and full video stream 336. In an embodiment, full video stream 336 is configured to be processed in real time by computer vision (CV) engine 352 and optical character recognition (OCR) engine 354. Features of user input metadata 334 act as a trigger mechanism for image processing of frames. For example, a timestamped user input of user input metadata 334 may be a visual event, such as a mouse click with cursor at coordinates x: 210, y: 450 on a screen of target HMI 322, a keyboard stroke, or a focus change, including window activation.

In an embodiment, AI analysis engine 350 analyzes, in real time, video frames immediately before, during, and after the visual event. Pre-input frames before a visual event cover about a one second through to the visual event. From these frames, the state of the GUI before visual event may be identified. Post-input frames during and after the visual event cover from the visual event to about one second after. From these frames, the GUI displays the result of the visual event.

For example, in an embodiment, CV engine 352 utilizes object detection models trained for GUIs. CV engine 352 first detects a bounding box and class of relevant GUI elements using a single-stage architecture, such as a Single-Shot Detector (SSD), You Only Look Once (YOLO), or RetinaNet. The architecture is trained on dataset of industrial, enterprise, and custom application GUIs, including buttons, text fields, sliding tabs, scrollbars, and windows. Affected features may include a button that was pressed or highlighted, a moved sliding tab, and text entered into a text field. Changes to the GUI may include one or more new windows, pop-ups, and icon changes (highlighted or lined-out). Labels of initiated applications may be detected as well.

CV engine 352 compares visual features in a region around coordinates x: 210, y: 450 in the analyzed video frames with one or more standard features in OT Interface Profile Database 356 to identify a graphical user interface (GUI) button with a label in text. In an embodiment, bounding boxes are provided for text elements. For example, bounding boxes may encompass a button label, a menu option, a status bar message, and the like. OCR is performed on areas within the bounding boxes for efficient processing by isolating text from a background with irrelevant features and processing a fraction of the entire area of the GUI.

In an embodiment, OCR engine 354 reads detected character features rather than the entire GUI screen. In an embodiment, OCR engine 354 may be a variant Tesseract. In another embodiment, OCR engine 354 may be Convolutional Recurrent Neural Network (CRNN)/Transformer-based model. OCR engine 354 reads the label. For example, the label may display "Stop Motor 3." In an embodiment, a visual feature like "Stop Motor 3," may be control for target HMI 322 or a control for one or more other OT assets controlled by target HMI 322. OT interface profile database 356 includes standard features, visual templates, object definitions, metadata, and the like of known industrial software interfaces. OT interface profile database 356 is connected to the Internet 304 to receive updates on graphical user interfaces of applications on HMIs for assets on OT network 320.

In another embodiment, CV engine 352 may detect, in real time, the one of the one or more remote users clicking into a labeled text field. Subsequently, OCR engine 354 may read the labeled text field to state "Setpoint A," as well as an associated value "100." OCR engine 354 then reads a new associated value to read "125," in analyzed video frames after "enter" user input metadata occurs. In this embodiment, "enter' in the user input metadata constitutes a modification in the visual feature "Setpoint A." As a result, AI analysis engine 350 identifies, in real time, this visual event as a value change for subsequent logging. In an embodiment a value change, such "Setpoint A" varying from "100" to "125" from "enter" in user input metadata, may be a value change in target HMI 322 or one or more other OT assets controlled by target HMI 322. In this embodiment, the value change is an action performed during a visual event. AI analysis engine 350 identifies, in real time, visual events from user input metadata 334 and full video stream 336 for brokered session 330 before subsequent log generation and audit summarization.

In an embodiment, AI analysis engine 350 forwards identified visual events to structured log generation module 360. In an embodiment, structured log generation module 360 translates the identified visual events into discrete, text-based logs 362. Logs 362 are authentic and tamper-proof as being generated from identified visual events in SRA broker 300. Logs 362 are completely derived and stored out-of-band from target HMI 322. Logs 362 are bound to the one of the one or more remote users of personal computer 302 in brokered session 330.

An example of a log in JavaScript Object Notation (JSON) format in logs 362 based on the example identified visual event discussed above is as follows:

```
{
  "timestamp": "2025-11-09T14:32:05Z",
  "session_id": 778,
  "remote_user": "john.doe@contractor.com",
  "source_ip": "101.5.2.3",
  "target_asset": "HMI-LINE-5",
  "target_account": "Operator",
  "log_source": "SRA_AI_Analyzer",
  "event_type": "GUI_Action",
  "action": "ParameterChange",
  "details": {
    "field_label": "Setpoint A",
    "old_value": "100",
    "new_value": "125"
  }
}
```

In an embodiment, logs 362 are forwarded to security information and event management server 370 for permanent storage, alerting, and correlation.

In an embodiment, upon termination of brokered session 330, AI analysis engine 350 forwards identified visual events from brokered session 330 to audit summarization module 380. From logs 363, audit summarization module 380 generates human-readable audit summary 385 of critical actions performed out of the identified visual events of brokered session 330. An example of a summary of a critical action of brokered session 330 based on the previously discussed visual event is as follows:

Session ID: 778
User: john.doe@contractor.com
Asset: HMI-LINE-5
Time: 14:30-14:45 (15 minutes)
Associated MoC Ticket: #T-9087
Key Actions Performed:
  a. Changed 'Setpoint A' from '100' to '125'.
  b. Clicked button 'Acknowledge Alarm 3B'.
  c. Navigated to screen 'Diagnostics Page'.
  d. Clicked button 'Stop Motor 3'.
Compliance Check: All actions conform to the approved scope of MoC Ticket #T-9087.

In an embodiment, an OT administrator or security analyst may review human-readable audit summary 385 in seconds rather than watching full video stream 336 for the duration of brokered session 330, typically several minutes. As a result, critical actions taken by the one of the one or more remote users during brokered session 330 may be instantly verified to be authorized by MoC ticket 328 with authenticity and minimal effort.

In some embodiments, the functional elements illustrated in FIG. 3 may be implemented in software, firmware, hardware, or in any suitable combination thereof. Such elements may reside, for example, in one or more processors, microcontrollers, digital signal processors, programmable logic devices, application-specific integrated circuits, or other processing circuitry. Alternatively, or in addition, the elements may be realized using computer-executable instructions stored on non-transitory machine-readable media and executed by one or more processing units. The particular manner in which the elements of FIG. 3 are implemented is not limiting, and any configuration capable of performing the described functions is within the scope of the present disclosure.

Figure 4:
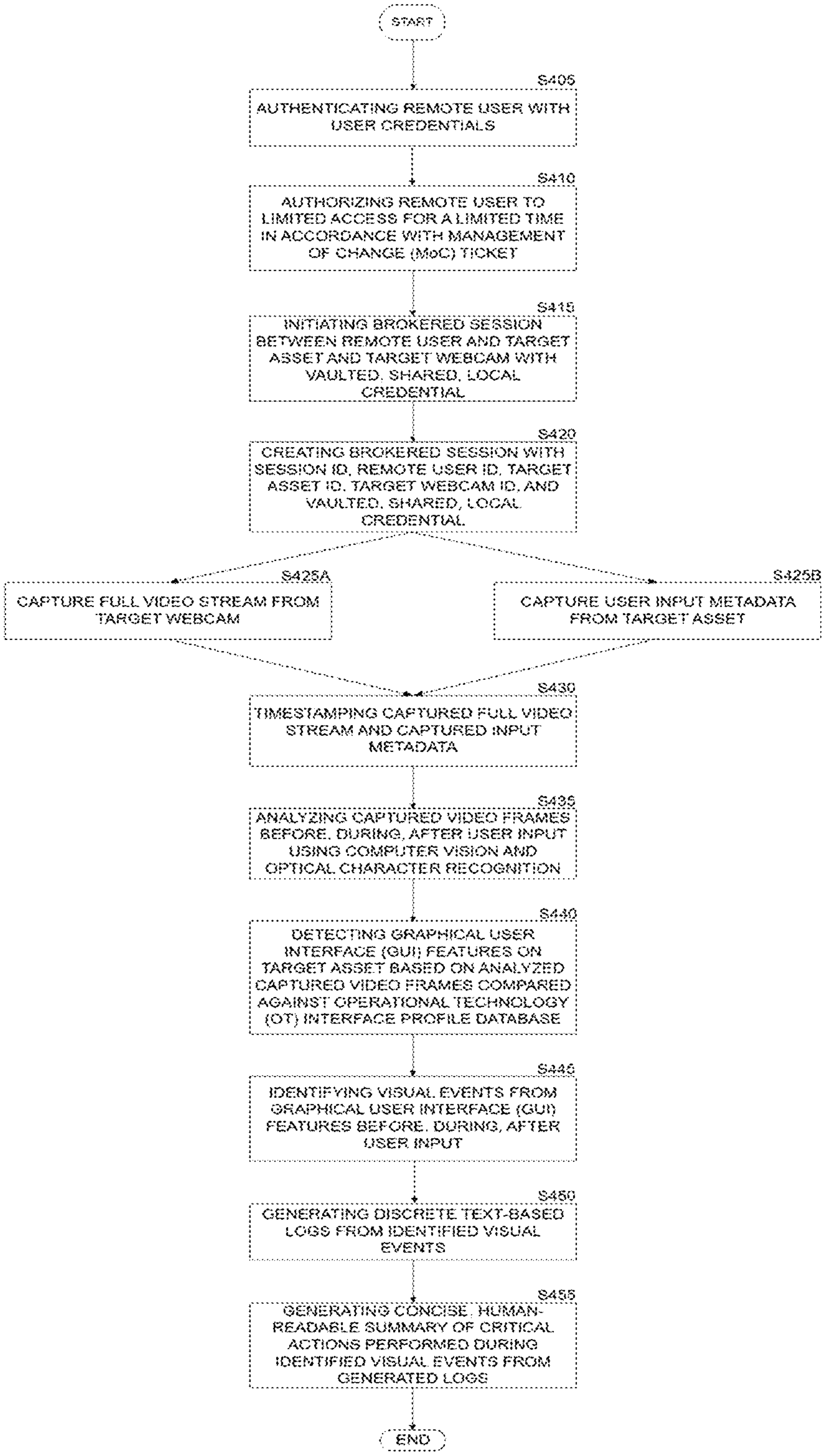
FIG. 4 is an example flowchart of a method of brokered session creation, brokered session data analysis, and log generation, implemented in accordance with an embodiment.

FIG. 4 is an example flowchart of a method of brokered session creation, brokered session data analysis, and log generation, implemented in accordance with an embodiment. Brokered session creation, session data analysis, and log generation may be performed by a SRA broker.

At S405, a user remote from an OT network is authenticated with user credentials provided by the remote user. In an embodiment, authentication may be performed using multi-factor authentication (MFA). In an embodiment, user credentials 306 may include other information to facilitate multi-factor authentication (MFA) for the one of the one or more remote users. In an embodiment, such information may include a username, a password, a personal identification number (PIN), an identifier of a target asset the remote user is trying to access, alternate contact information to the one of the one or more remote users, and the like. Upon authentication, the remote user may be allowed to access the target asset on the OT network.

However, in an embodiment, authentication of the remote user fails. In this embodiment, the failed authentication may be logged as an event including any of a record of an identifier of the one of the one or more remote users, such as an email address, an identifier of a target asset remote user attempted to access, desired resources on the target asset, a timestamp indicating the time and date of the failed authentication, and the like.

At S410, upon successful authentication, in an embodiment, the remote user is authorized for limited access and a limited time to the target asset on the OT network based on a management of change (MoC) ticket retrieved from a management controller of the OT network. The MoC ticket is configured to limit the permissible activity and duration of access of the remote user to the target asset.

At S415, a brokered session between the remote user and target asset and target webcam is initiated with a vaulted, shared, local credential. The target webcam is configured to capture video of a graphical user interface (GUI) on a screen of the target asset. The vaulted, shared, local credential may be intended for the role of the remote user in accessing the target asset.

At S420, in an embodiment, a brokered session is created with an assigned session identifier (ID), an ID of the remote user, an ID of the target asset, an ID of the target webcam, the vaulted, shared, local credential. In an embodiment, the brokered session is made immutable from tampering by the remote user or other users accessing one or more assets on the OT network. For example, in an embodiment, the brokered session may include Session_ID: 778 mapping the remote user: john.doe@contractor.com to target HMI/target webcam using vaulted, shared local credential: Operator.

At S425A, a full video stream of the GUI of the target asset during the brokered session is captured from the target webcam. In an embodiment, the full video stream includes features and labeling in the GUI of the target asset as well as movement of the cursor.

At S425B, a user input metadata is captured from the target asset. In an embodiment, the user input metadata includes keystrokes, mouse/cursor movement, mouse clicks at coordinates in the GUI where the cursor is located, and the like.

At S430, in an embodiment, the captured full video stream and captured input metadata are timestamped. In an embodiment, the user input metadata may be a list of user inputs, where a listed user input is time correlated with frames of the full video stream immediately before, during, and after the listed user input.

At S435, in an embodiment, captured video frames occurring before, during, and after user input are analyzed, in real time, using computer vision (CV) and optical character recognition (OCR).

At S440, in an embodiment, features in the GUI of the target asset are detected based on captured video frames compared against an OT interface profile database. In an embodiment, visual elements in the captured video frames are detected, in real time, by CV around click coordinates of a position of a mouse. For example, in an embodiment, visual elements in a region around coordinates x: 210; y: 450 are compared with visual elements in an OT Interface Profile Database to identify, in real time, a GUI button with a label in text. Subsequently, the label is interpreted by OCR to display "Stop Motor 3."

At S445, in an embodiment, a mouse click with the cursor located in a labeled text field may be detected by CV. Subsequently, the labeled text field is interpreted by OCR to state "Setpoint A," as well as an associated value "100." Next, a new associated value is interpreted by OCR to read "125," in analyzed video frames after "enter" user input metadata occurs. As a result, an action is identified from this visual event as a value change for subsequent logging. In an embodiment, actions from visual events are detected throughout session in real time as the session is occurring.

At S450, in an embodiment, discrete text-based logs are generated, in real time, from identified visual events. The logs are authentic and tamper-proof as being generated from identified visual events. The logs are completely derived and stored out-of-band from the target asset. In an embodiment, the logs may be formatted in JavaScript Object Notation (JSON). The logs are bound to the remote user in the brokered session. Additionally, in an embodiment, a log entry of a visual event in the logs may include a timestamp, a brokered session ID, a remote user ID, a source IP address of the remote user, a target asset ID, a target webcam ID, a target asset access account ID, an SRA broker ID, an event type, an action taken, details of the action taken, and the like. In an embodiment, the logs may be forwarded to a security information and event management server for permanent storage, alerting, and correlation.

At S455, upon termination of the brokered session, a concise, human-readable summary of critical actions performed during identified visual events of the brokered session is generated from the generated logs. For example, in an embodiment, a concise, human-readable summary of critical actions may include a brokered session ID, a remote user ID, a target asset ID, a target webcam ID, a certification of compliance with MoC ticket ID, and the like.

Figure 5:
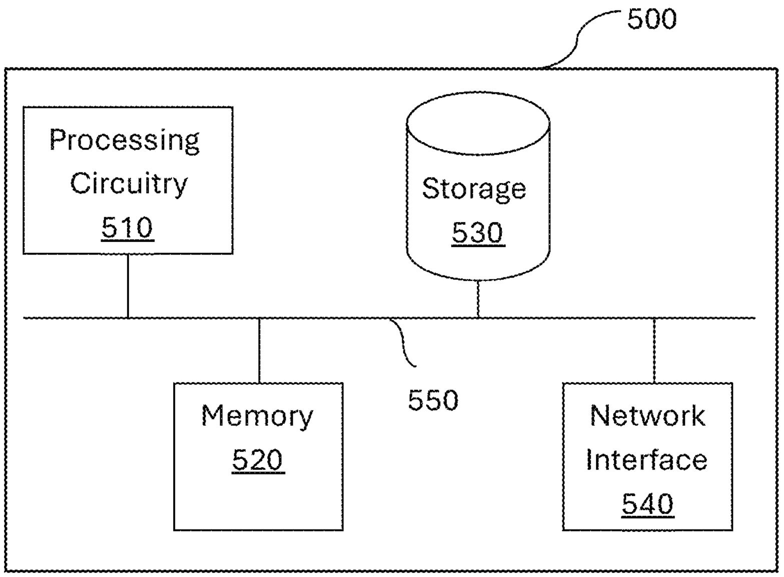
FIG. 5 is an example schematic diagram of a session remote access (SRA) broker according to an embodiment.

FIG. 5 is an example schematic diagram of session remote access (SRA) broker 500 according to an embodiment. The SRA broker includes, according to an embodiment, a processing circuitry 510 coupled to a memory 520, a storage 530, and a network interface 540. In an embodiment, the components of SRA broker 500 are communicatively connected via a bus 550.

In certain embodiments, the processing circuitry 510 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 520 is a volatile memory (e.g., random access memory, etc.), a non-volatile memory (e.g., read only memory, flash memory, etc.), a combination thereof, and the like. In some embodiments, the memory 520 is an on-chip memory, an off-chip memory, a combination thereof, and the like. In certain embodiments, the memory 520 is a scratch-pad memory for the processing circuitry 510.

In one configuration, software for implementing one or more embodiments disclosed herein is stored in the storage 530, in the memory 520, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 510, cause the processing circuitry 510 to perform the various processes described herein, in accordance with an embodiment.

In some embodiments, the storage 530 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 540 is configured to provide the SRA broker with communication with, for example, the network 540, according to an embodiment.

It should be understood that the embodiments described herein are not limited to the specific architecture illustrated in FIG. 5, and other architectures may be equally used without departing from the scope of the disclosed embodiments.

Furthermore, in certain embodiments a management controller may be implemented with the architecture illustrated in FIG. 5. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for securely logging one or more actions during a session between an operational technology (OT) asset and a user remote from the OT asset, comprising:

authenticating the user with user credentials to access the OT asset;

creating a session between the user and the OT asset, the session configured to allow the user to control the OT asset through a graphical user interface (GUI) of the OT asset;

capturing user input metadata during the session from the OT asset;

capturing a video stream from a webcam configured to view the GUI;

timestamping the captured user input metadata and the video stream;

analyzing, in real time, frames of the video stream before, during, and after one or more pieces of user input metadata;

identifying, in real time, one or more actions performed during the session from the analyzed frames; and generating, in real time, text-based logs from one or more identified visual events.

2. The method of claim 1, further comprising:

authorizing the user a limited access to the OT asset for a predefined limited time during the session in accordance with a management of change (MoC) ticket.

3. The method of claim 1, further comprising:

binding to the session an identifier to allow access to the OT asset, wherein the identifier is any one of: an identifier of the session, an identifier of the user, an identifier of the OT asset, an identifier of a role of a user, and an identifier of the webcam.

4. The method of claim 1, wherein analyzing the frames of the video stream further comprises:

detecting one or more visual features in the GUI using computer vision (CV);

comparing the one or more detected, visual features with one or more standard features in an OT interface profile database; and identifying one or more control features in the GUI from one or more matches between the one or more detected visual features and the one or more standard features, wherein the one or more of the identified control features, configured to control any of the OT asset or one or more other OT assets, controlled by the OT asset, based on the compared, detected one or more visual features.

5. The method of claim 4, wherein analyzing the frames of the video stream further comprises:

interpreting one or more text labels among the one or more detected visual features with optical character recognition (OCR).

6. The method of claim 5, wherein identifying visual events from the analyzed frames further comprises:

identifying one or more visual events from one or more modifications in the detected visual features before, during, and after one of the one or more pieces of user input metadata.

7. The method of claim 6, wherein a visual event of the one or more identified visual event is a placement of a cursor in the GUI, by a mouse operated by the user, at one of the one or more identified control features in the GUI to adjust the one of the one or more identified control features.

8. The method of claim 6, wherein an action performed during the one or more identified visual event is an adjustment of one of the one or more identified control features in the GUI.

9. The method of claim 6, wherein an action performed during the one or more identified visual event is a change in a setpoint, indicated in the GUI, of the OT asset or one of one or more other OT assets, controlled by the OT asset.

10. The method of claim 1, further comprising:

generating a human-readable summary of one or more actions performed during the one or more identified visual events.

11. A non-transitory computer-readable medium storing a set of instructions for securely logging one or more actions during a session between an operational technology (OT) asset and a user remote from the OT asset, the set of instructions comprising:

one or more instructions that, when executed by one or more processing circuitries of a device, cause the device to:

authenticate the user with user credentials to access the OT asset;

create a session between the user and the OT asset, the session configured to allow the user to control the OT asset through a graphical user interface (GUI) of the OT asset;

capture user input metadata during the session from the OT asset;

capture a video stream from a webcam configured to view the GUI;

timestamp the captured user input metadata and the video stream;

analyze, in real time, frames of the video stream before, during, and after one or more pieces of user input metadata;

identify, in real time, one or more actions performed during the session from the analyzed frames; and generate, in real time, text-based logs from one or more identified visual events.

12. A system for securely logging one or more actions during a session between an operational technology (OT) asset and a user remote from the OT asset comprising:

a processing circuitry;

a memory, the memory containing instructions that, when executed by the processing circuitry, configure the system to:

authenticate the user with user credentials to access the OT asset;

create a session between the user and the OT asset, the session configured to allow the user to control the OT asset through a graphical user interface (GUI) of the OT asset;

capture user input metadata during the session from the OT asset;

capture a video stream from a webcam configured to view the GUI;

timestamp the captured user input metadata and the video stream;

analyze, in real time, frames of the video stream before, during, and after one or more pieces of user input metadata;

identify, in real time, one or more actions performed during the session from the analyzed frames; and generate, in real time, text-based logs from one or more identified visual events.

13. The system of claim 12, wherein the memory contains further instructions which when executed by the processing circuitry further configure the system to:

authorize the user a limited access to the OT asset for a predefined limited time during the session in accordance with a management of change (MoC) ticket.

14. The system of claim 12, wherein the memory contains further instructions which when executed by the processing circuitry further configure the system to:

bind to the session an identifier to allow access to the OT asset, wherein the identifier is any one of:

an identifier of the session, an identifier of the user, an identifier of the OT asset, an identifier of a role of a user, and an identifier of the webcam.

15. The system of claim 12, wherein the memory contains further instructions that, when executed by the processing circuitry for analyzing the frames of the video stream, further configure the system to:

detect one or more visual features in the GUI using computer vision (CV);

compare the one or more detected, visual features with one or more standard features in an OT interface profile database; and identify one or more control features in the GUI from one or more matches between the one or more detected visual features and the one or more standard features, wherein the one or more of the identified control features, configured to control any of the OT asset or one or more other OT assets, controlled by the OT asset, based on the compared, detected one or more visual features.

16. The system of claim 15, wherein the memory contains further instructions that, when executed by the processing circuitry for analyzing the frames of the video stream, further configure the system to:

interpret one or more text labels among the one or more detected visual features with optical character recognition (OCR).

17. The system of claim 16, wherein the memory contains further instructions that, when executed by the processing circuitry for identifying visual events from the analyzed frames, further configure the system to:

identify one or more visual events from one or more modifications in the detected visual features before, during, and after one of the one or more pieces of user input metadata.

18. The system of claim 17, wherein a visual event of the one or more identified visual event is a placement of a cursor in the GUI, by a mouse operated by the user, at one of the one or more identified control features in the GUI to adjust the one of the one or more identified control features.

19. The system of claim 17, wherein an action performed during the one or more identified visual event is an adjustment of one of the one or more identified control features in the GUI.

20. The system of claim 17, wherein an action performed during the one or more identified visual event is a change in a setpoint, indicated in the GUI, of the OT asset or one of one or more other OT assets, controlled by the OT asset.

21. The system of claim 12, wherein the memory contains further instructions which when executed by the processing circuitry further configure the system to:

generate a human-readable summary of one or more actions performed during the one or more identified visual events.

* * * * *